United States Patent
Beverly et al.

(10) Patent No.: US 8,683,045 B2
(45) Date of Patent: Mar. 25, 2014

(54) INTERMEDIATE NETWORK DEVICE FOR HOST-CLIENT COMMUNICATION

(75) Inventors: Harlan T. Beverly, McDade, TX (US); Kumar Gala, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 11/770,128

(22) Filed: Jun. 28, 2007

(65) Prior Publication Data

US 2008/0016166 A1    Jan. 17, 2008

Related U.S. Application Data (60) Provisional application No. 60/807,517, filed on Jul. 17, 2006.

(51) Int. Cl.
*G06F 15/16* (2006.01)

(52) U.S. Cl.
USPC .......................................... 709/227; 709/217

(58) Field of Classification Search
USPC ................... 709/206, 227; 380/270
See application file for complete search history.

(56) References Cited

U.S. PATENT DOCUMENTS

| | | | |
|---|---|---|---|
| 5,353,412 A | 10/1994 | Douglas et al. | |
| 5,355,371 A | 10/1994 | Auerbach et al. | |
| 5,675,736 A | 10/1997 | Brady et al. | |
| 5,771,287 A | 6/1998 | Gilley et al. | |
| 5,890,963 A | 4/1999 | Yen | |
| 6,015,348 A | 1/2000 | Lambright et al. | |
| 6,240,517 B1 | 5/2001 | Nishioka | |
| 6,480,900 B1 * | 11/2002 | Habert | 709/245 |
| 6,615,218 B2 | 9/2003 | Mandal et al. | |
| 6,625,661 B1 | 9/2003 | Baldwin, Jr. et al. | |
| 6,745,236 B1 | 6/2004 | Hawkins et al. | |
| 6,763,371 B1 | 7/2004 | Jandel | |
| 6,810,528 B1 | 10/2004 | Chatani | |
| 6,868,450 B1 * | 3/2005 | Lucovsky | 709/229 |
| 6,908,389 B1 | 6/2005 | Puskala | |
| 6,918,042 B1 | 7/2005 | Debry | |
| 6,941,353 B1 | 9/2005 | Lane | |
| 6,950,873 B2 * | 9/2005 | Jain et al. | 709/228 |
| 6,961,852 B2 | 11/2005 | Craft | |
| 6,988,196 B2 | 1/2006 | Cromer et al. | |
| 7,000,115 B2 | 2/2006 | Lewis et al. | |
| 7,003,548 B1 | 2/2006 | Barck et al. | |
| 7,046,680 B1 | 5/2006 | McDysan et al. | |
| 7,065,756 B2 | 6/2006 | Barsness et al. | |

(Continued)

FOREIGN PATENT DOCUMENTS

| | | |
|---|---|---|
| DE | 10218795 | 11/2003 |
| JP | 10314451 | 12/1998 |
| JP | 2001246147 | 9/2001 |

OTHER PUBLICATIONS

PCT International Search Report, dated Jul. 15, 2008, 8 pages.

(Continued)

*Primary Examiner* — Gerald Smarth
(74) *Attorney, Agent, or Firm* — DeLizio Gilliam, PLLC (57) ABSTRACT

A method for receiving a first indication from a host device is comprised. The device is a first port of the host device that has been reserved fro a network device. The method also poses as the host device at the network device in response to a receipt of the first indication.

21 Claims, 4 Drawing Sheets

(56) References Cited

U.S. PATENT DOCUMENTS

| | | | |
|---|---|---|---|
| 7,139,780 B2 | 11/2006 | Lee et al. | |
| 7,174,390 B2* | 2/2007 | Schulter et al. | 709/245 |
| 7,209,449 B2 | 4/2007 | Tang et al. | |
| 7,249,109 B1 | 7/2007 | Silverbrook et al. | |
| 7,274,702 B2 | 9/2007 | Toutant et al. | |
| 7,937,447 B1* | 5/2011 | Cohen et al. | 709/212 |
| 2002/0078223 A1 | 6/2002 | Baldonado et al. | |
| 2002/0078383 A1* | 6/2002 | Leerssen et al. | 713/201 |
| 2002/0169884 A1* | 11/2002 | Jean et al. | 709/230 |
| 2002/0180583 A1 | 12/2002 | Paatero et al. | |
| 2002/0181395 A1* | 12/2002 | Foster et al. | 370/229 |
| 2002/0198932 A1 | 12/2002 | Wagner | |
| 2003/0002508 A1* | 1/2003 | Dierks et al. | 370/395.52 |
| 2003/0081783 A1* | 5/2003 | Adusumilli et al. | 380/270 |
| 2003/0097592 A1* | 5/2003 | Adusumilli | 713/201 |
| 2003/0154306 A1* | 8/2003 | Perry | 709/245 |
| 2003/0177187 A1 | 9/2003 | Levine et al. | |
| 2003/0191857 A1 | 10/2003 | Terrell et al. | |
| 2004/0054747 A1* | 3/2004 | Breh et al. | 709/208 |
| 2004/0068580 A1 | 4/2004 | Jo et al. | |
| 2004/0103225 A1* | 5/2004 | McAlpine et al. | 710/52 |
| 2004/0111498 A1* | 6/2004 | Andreas | 709/220 |
| 2004/0230801 A1 | 11/2004 | Sueyoshi et al. | |
| 2004/0246905 A1 | 12/2004 | Dunagan et al. | |
| 2004/0268149 A1* | 12/2004 | Aaron | 713/201 |
| 2005/0080919 A1* | 4/2005 | Li et al. | 709/236 |
| 2005/0107161 A1 | 5/2005 | Fujimoto et al. | |
| 2005/0188073 A1 | 8/2005 | Nakamichi et al. | |
| 2005/0246443 A1* | 11/2005 | Yao et al. | 709/227 |
| 2006/0075080 A1* | 4/2006 | Burr et al. | 709/223 |
| 2006/0259579 A1 | 11/2006 | Beverly | |
| 2006/0259632 A1 | 11/2006 | Crawford et al. | |
| 2006/0274750 A1* | 12/2006 | Babbar et al. | 370/390 |
| 2006/0294595 A1 | 12/2006 | Drihem | |
| 2007/0005986 A1 | 1/2007 | Bernard et al. | |
| 2007/0060373 A1 | 3/2007 | Beverly | |
| 2007/0086343 A1 | 4/2007 | Kujawa et al. | |
| 2007/0101408 A1 | 5/2007 | Nakhjiri | |
| 2007/0189517 A1 | 8/2007 | Koseki et al. | |
| 2007/0226498 A1 | 9/2007 | Walmsley et al. | |
| 2007/0297405 A1 | 12/2007 | He | |
| 2007/0298879 A1 | 12/2007 | Kobayashi et al. | |
| 2008/0009337 A1 | 1/2008 | Jackson et al. | |
| 2008/0009352 A1 | 1/2008 | Aoyama et al. | |
| 2008/0010371 A1 | 1/2008 | Yamamoto et al. | |
| 2008/0013551 A1 | 1/2008 | Scholl | |
| 2008/0016236 A1 | 1/2008 | Beverly et al. | |
| 2008/0022389 A1 | 1/2008 | Calcev et al. | |
| 2008/0039208 A1 | 2/2008 | Abrink et al. | |
| 2008/0045285 A1 | 2/2008 | Fujito | |
| 2008/0049621 A1 | 2/2008 | McGuire et al. | |
| 2009/0019141 A1* | 1/2009 | Bush et al. | 709/223 |
| 2009/0172301 A1* | 7/2009 | Ebersole et al. | 711/154 |

OTHER PUBLICATIONS

Written Opinion—PCT/US2007/072337—International Search Authority European Patent Office—Jul. 15, 2008.

* cited by examiner

FIG. 4

INTERMEDIATE NETWORK DEVICE FOR HOST-CLIENT COMMUNICATION

CROSS-REFERENCE TO RELATED APPLICATION(S)

This application claims priority to U.S. Provisional Patent Application No. 60/807,517, entitled "Method and System for Permitting a network Device to Pose as a Host Device for Any Use," filed on Jul. 17, 2006, which is assigned to the current assignee hereof and are incorporated herein by reference in their entirety.

FIELD OF THE DISCLOSURE

The present disclosure relates to network devices and more particularly to network devices that facilitate communications between a client and a host.

BACKGROUND

A network may be characterized by several factors like who can use the network, the type of traffic the network carries, the medium carrying the traffic, the typical nature of the network's connections, and the transmission technology the network uses. For example, one network may be public and carry circuit switched voice traffic while another may be private and carry packet switched data traffic. Whatever the make-up, most networks facilitate the communication of information between at least two nodes, and as such act as communication networks.

In recent years, several applications have been developed that rely on timely and effective interactions between two or more elements of a communication network. For example, an online banking server, or host, may interact with hundreds or thousands of client computers via the communication network. With such an architecture, the networked host computer is frequently tasked with providing content to clients, receiving client requests, processing those requests, and responding to those requests, and synchronizing those requests with the requests of other clients.

It is sometimes useful for the host machine to use other resources, such as other servers, in the communication network to process and respond to client requests. This allows the requests to be processed more quickly and with enhanced security. However, the use of the other servers can introduce an undesirable amount of additional overhead in the communications between the host and the client. For example, the host machine can indicate to the client that particular requests should be routed to another server. This may require modification of communicating software at the client machine, such as through a software patch, resulting in an undesirable delay in communications. Further, in some cases it is undesirable to inform the client machine that tasks have been transferred from the host to other resources. Accordingly, there is a need for an improved network device that allows a host machine to transfer tasks.

DETAILED DESCRIPTION

A network device facilitates communications between two computer devices in a network, such as between a host and a client. The network device is able to pose as a first computer device in the network, thereby intercepting and processing communications from a second computer device that were targeted for the first computer device. The first computer device indicates to the network device that communication ports associated with the first computer device have been reserved for the network device. The network device intercepts communications from the second computer device targeted to the reserved port and processes the communications. Thus, the network device poses as the first computer device in a manner that is transparent to the first computer device, allowing communications to be processed at the network device without modification of software at the second computer device.

Embodiments discussed below describe, in part, distributed computing solutions that manage all or part of a communicative interaction between network elements. In this context, a communicative interaction may be one or more of: intending to send information, sending information, requesting information, receiving information, or receiving a request for information. As such, a communicative interaction could be one directional, bi-directional, or multi-directional. In some circumstances, a communicative interaction could be relatively complex and involve two or more network elements. For example, a communicative interaction may be "a conversation" or series of related communications between a client and a host server—each network element sending and receiving information to and from the other. Whatever form the communicative interaction takes, it should be noted that the network elements involved need not take any specific form. A network element, including a network device, may be a node, a piece of hardware, software, firmware, middleware, some other component of a computing system, and/or some combination thereof.

Though much of the following discussion focuses on specific problems associated with particular network interactions, such as online banking or online gaming, the teachings disclosed herein may have broader applicability. As such, discussions relating to particular examples, and other applications such as Video On Demand, entertainment distribution, information distribution, etc., may also be implemented in a manner that incorporates the teachings disclosed herein.

From a high level, a system incorporating teachings of the present disclosure may include a network device that poses as a host device for particular communications between a client program resident on a user machine and a server program resident on a host computing device remote from the user. The server program may be part of a two-tier architecture that is deployed in a hub and spoke or centralized server configuration. The server program may also be utilized in a less centralized model. For example, the server program may be implemented as one of two or more client programs that perform server-like functionality. In addition, the host device can be one user machine that communicates with the client program at a second user machine via a peer-to-peer (P2P) network configuration. Thus, host device and user machine can be any two computer devices in a network, including two user machines, two server devices, a user machine and a server device, and any combination thereof.

However, the server program is implemented, the network device may be utilized to effectively pose as the host for certain communications from the client program. For example, the network device may intercept certain client initiated communications intended for the server program, process those communications without server program involvement, and respond to the client program. In some circumstances, the network device may make it unnecessary to actually send the original client request to the server. Depending upon implementation detail, a different message—one indicating that the original client request has already been handled—may be sent from the processor module to the server. In practice, processing the communications without burdening the server program and without traversing a portion of the network may help reduce problems such as latency, lag, and loss of data coherency. In addition, processing the communications without burdening the server program frees resources to allow the server computer to execute other programs and tasks.

Further, because the network device poses as the host server, numerous programs or tasks can be executed by the network device and by the host server while maintaining a relatively simple communications overhead between the host server and client programs. That is, if the network device has been assigned to pose as the host for particular communications, this assignment is transparent to the client programs. Accordingly, the client program does not have to be adjusted or patched in order to provide the appropriate communications to the network device.

Figure 1:
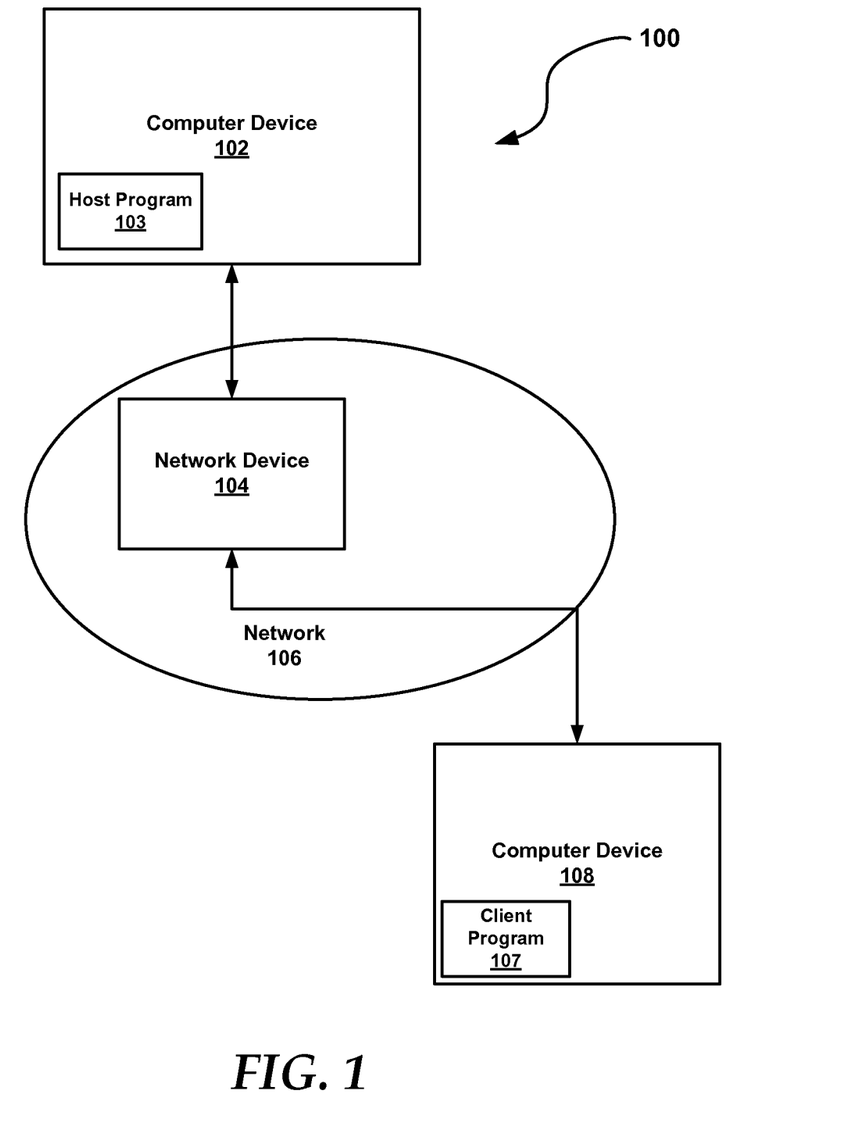
FIG. 1 is a block diagram of a particular embodiment of a network configuration.

As indicated above, this application claims priority to U.S. Provisional Patent Application No. 60/807,517 filed on Jul. 17, 2006. The provisional application describes in part specific implementations of the teachings disclosed herein and are not intended to limit the scope of the claims attached below. The entirety of the provisional application is incorporated herein by reference As mentioned above, FIG. 1 depicts a block diagram of a network arrangement 100 that includes a host program 103 executing at a host computing device 102, a network 106 including a network device 104, and a client-side program 107 executing at a computing device 108. The actual location of the network device 104 may be modified in other deployments. For example, the network device may be implemented at the host computing device 102 as a network card, a processor dongle, a "Lan on Motherboard" processor, etc. In the embodiment of FIG. 1, network 106 may be a wide area network, such as the Internet, a local area network, or some other appropriate network or bus. Within arrangement 100, computing devices 102 and 108 may be similar or different. For example, computing device 108 may be a local user computer, a laptop, a cellular telephone, a gaming console, a workstation, or some other appropriate device, and host computing device 102 may be a server computer, a workstation, a peer of computing device 108, or some other appropriate device.

In operation, the client-side program 107 and the host program 103 may communicate with each other via the network 106, and in particular via the network device 104. In one embodiment, the client program 107 (occasionally referred to as client 107) and host program 103 (occasionally referred to as host 103) may work together to provide a user of computing device 108 with an online experience. In operation, client-side program 107 may receive content from server-side program 102 and may occasionally send requests to host program 103 in an effort to affect the content being provided or to modify data at the host program 103. As shown, FIG. 1 includes only one device executing a client program. In practice, however, server-side program 103 and computing device 102 may be providing content to many clients at or near the same time.

In operation, the client program 107 may send communications or messages to the host program 103 to update information, request that tasks be performed, and the like. For example, the host program 103 can be an online banking application and the client program 107 can be a web browser. The client program 107 can send requests to the host program 103 to view account information, conduct transactions, and the like. In response, the host program 103 can determine if the requested tasks are authorized and, if so, execute the tasks.

To communicate with the host program 103, the client program 107 sends messages via the network 106, and in particular such that the messages pass through the network device 104. Each message includes information, such as address information, indicating the location of the computer device 102. Each message also includes port information, indicating the target port of the computer device 102 with which the message is associated. The network device 104 provides the message to the computer device 102, which routes the message to the appropriate program based on the port information.

Each program executing at the computer device 102, including the host program 103, is associated with one or more ports. Further, different modules of each program can be associated with a different port. For example, the host program 103 can include a module to provide display information to the client program 107 and a module to manage a database at the computer device 102. Each of these modules can be associated with its own port, so that the client program 107 can interact with different modules of the host program by targeting messages to different ports of the computer device 102.

In operation, the host program 103 can instruct the network device 104 to pose as the host program 103 for particular messages of the client program 107. To have the network device 104 pose as the host, the host program 103 reserves one or more ports at the computer device 102. This indicates to the computer device 102 that the reserved ports should not be assigned to other programs. In addition, the host program 103 sends a message to the network device 104 indicating that the ports have been reserved. In response, the network device determines if messages received from the client program 107 are targeted for a reserved port. If so, the network device 104 processes the message. The message can be processed at the network device 104 using instructions provided by the computer device 102 or by using pre-loaded instructions or by using instructions from some other source such as from other devices in the network 106 or external memory.

In response to processing the message, the network device 104 can send information to the client program 107. Because the network device 104 is posing as the host program 103, the information provided by the network device 104 can be similar or the same as information that would have been provided by the host program 103 if the message had not been intercepted.

As an example, the host program 103 can be an online banking program including an authentication module associated with a port of the computer device 102. The host program 103 reserves the port and indicates to the network device 104 that the port has been reserved, and provides the authentication module to the network device 104. The client program 107 can be a browser that interacts with the host program 103. As part of an online banking transaction, the client program 107 sends authentication information via a message targeted to the port associated with the authentication module. The network device 104 receives the message including the authentication information and determines it has been reserved. Accordingly, the network device 104 processes the message by executing the authentication module to determine whether the authentication information authenticates the client program 107. The authentication module at the network device 104 provides information to the client program 107 indicating whether the program has been authorized. The authentication module can also provide information to the host program 103 indicating whether the client program 107 has been authorized. Thus, the network device 104 poses as the host program 103 to execute the authentication module. In this example, it is transparent to the client program 107 that the network device 104 is posing as the host program 103 with respect to the authentication module. This allows the authentication module to be offloaded to the network device 104 without modification to the client program 107.

Figure 2:
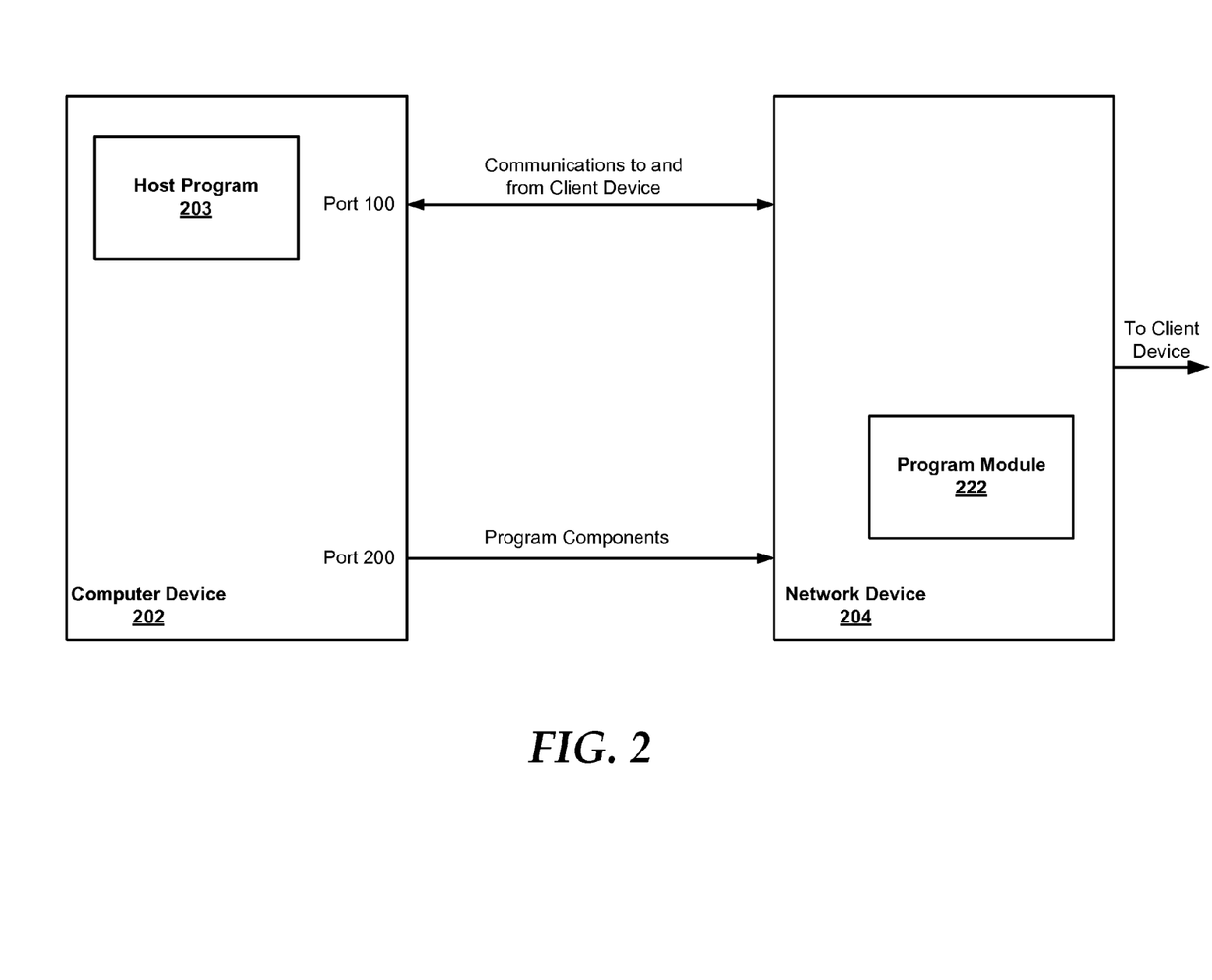
FIG. 2 is a block diagram of a particular embodiment of a computer device connected to a network device.

In order to allow the network device 104 to pose as the host program 103 for particular tasks, instructions associated with those tasks can be provided to the network device 104 from the host program 103. FIG. 2 illustrates a block diagram of a particular embodiment of an arrangement that allows a computer device 202 to provide a program module 222 to a network device 204.

As illustrated, the computer device 202 executes a host program 203. The host program 203 can include a number of modules, including program module 222. In a particular embodiment, the program module 222 executes one or more tasks on behalf of the host program 203. In another particular embodiment, the program module 222 is a stand-alone program, and the host program 203 is an overhead program or module that supplies the program module 222 with the program module 222.

In order to provide the program module 222 to the network device 204, the host program 203 creates a network socket and sets a socket option for the socket. In a particular embodiment, the socket option is set by calling SETSOCKOPT to an unused socket option, such as 8801. In another embodiment, a pre-arranged network port and network socket is built in to the network device 204 and the host program 203. In conjunction with opening the socket, the host program 103 sends a 'prepare' command to the network device 102, indicating that the program module 222 is to be provided. In a particular embodiment, the host program 203 is a program or module that intercepts the socket option command from other programs at the computer device 2 and sends the 'prepare' command in response to the socket option. In another particular embodiment, the host program 203 is a program or module that intercepts the socket open command from other programs at the computer device 202 and sends the 'prepare' command in response to the socket open command on the pre-arranged socket. In a particular embodiment, the 'prepare' command is sent on the pre-arranged socket with a normal socket send function. In still another particular embodiment, the network device 204 can monitor all incoming traffic for the prepare command. In response to detecting that the prepare command has been received via a particular socket, the network device prepares to receive the program module 222 via that same socket, or via a different socket if so indicated by the prepare command.

The prepare command indicates a port and address information where the program module 222 will be delivered to at the network device 204. In the illustrated example of FIG. 2, port 200 is reserved for transmission of the program module 222. In response to receiving the prepare command, the network device monitors 204 network traffic flows through it for the instructions associated with the program module 222 by monitoring for communications targeted to port 200.

The port 200 can be maintained for use after the program module 222 has been provided to allow for subsequent instructions to be provided, such as instructions to modify the program module 222, and to allow for communication of other information between the host program 203 and the network device 204. Alternatively, the host program 203 may open another socket, associated with a different port and address, and give a separate 'prepare' message to the network device 204.

In a particular embodiment, the port 200 and address information associated with the transfer of the program module 222 indicate a loopback Internet Protocol (IP) address. By binding to a loopback IP address and loopback port, and reserving the port, the host program 203 can send information to the network device 204 via a bound-to loopback port. The information sent via the loopback is not received by the host program 203, as would occur if the port 200 were not reserved for the network device 204. Instead, the network device 204 can listen on the reserved port 200, and when the loopback operation occurs, it will go to program module 222 rather than the host program 203. Accordingly, using the loopback port provides a simple way for the host program 203 to communicate with the network device 204, thereby reducing communication overhead.

As illustrated in FIG. 2, the host program 203 has reserved a port 100 for communications with the client program 107. The network device 204 monitors traffic flows for messages targeted to port 100 of the computer device 202, and provides those communications to the host program 203 via the port 100. Accordingly, the network device 204 uses different ports to receive the program module 222 and facilitate communications between the client program 107 and the host program 103.

Figure 3:
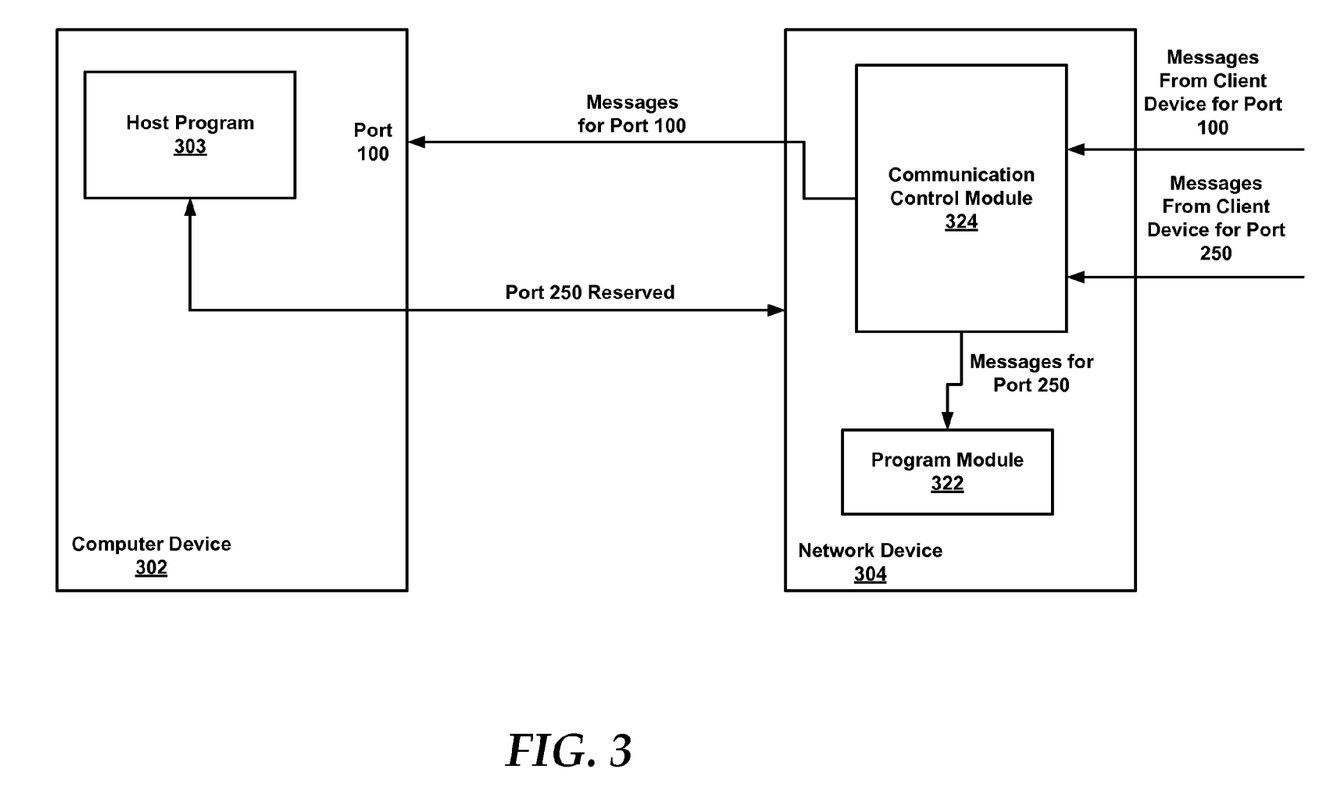
FIG. 3 is a block diagram of an alternative embodiment of a computer device connected to a network device.

Referring to FIG. 3, a block diagram illustrating a particular embodiment of a network device 304 posing as a host program 303 is illustrated. The host program 303 is stored at the computer device 302, corresponding to the computer device 102 of FIG. 1. The network device 304 stores a program module 322. In a particular embodiment, the program module 322 corresponds to a module of the host program 303, and has been provided in accordance with the procedure described above with respect to FIG. 2. The network device 304 also includes a communication control module 324.

In operation, the host program 303 instructs the network device 304 to pose as the host program 303. In particular, the host program 303 indicates to the network device 304 that port 250 has been reserved for the network device 304. In response, the communication control module 324 monitors communications from the client 107. In the illustrated example, the client 107 provides messages targeted for port 100 and port 250 of the computer device 302. Port 100 and port 250 are each associated with different modules or functions of the host program 103. In an alternative embodiment, port 100 and port 250 can each be associated with different programs at the computer device 302.

The communication control module 324 analyzes incoming messages from the client 107. Messages targeted to port 100 are routed to the computer device 302 for processing. Messages targeted to port 250 are intercepted and provided to the program module 322 for processing. Accordingly, the network device 304 poses as the host program 303 for messages targeted to the port 250. This allows the host program 303 to use the resources of the network device 304 to process those messages, using the program module 322, without patching or otherwise changing the client program 107. The program module 322 performs similarly to how it would perform at the computer device 102, so that the location of the program module 322 is transparent to the client program 107. For example, the program module 322 can respond to messages from the client by issuing reply messages, execute particular tasks in response to incoming messages, and the like.

In addition, the host program 303 can instruct the communication control module 324 to process messages targeted for port 250 in different ways. For example, the host program 303 can indicate that port 250 is reserved, but all incoming messages for that port should be provided to both the computer device 302 and to the program module 322. Accordingly, processing of messages targeted to port 250 can be distributed between the network device 304 and the computer device 302.

In another particular embodiment, the program module 322 can request that the host program 303 reserve port 250 for the network device 304. In response to the request, the host program 303 requests the computer device 302 to reserve port 250 for the host program 303. Once port 250 has been reserved, the host program 303 notifies the program module 322 that it can now intercept communications targeted for the port. If port 250 cannot be reserved (for example, if it has already been reserved by another program at the computer device 302), the host program 303 notifies the program module 322. In response, the program module 322 can request a different port or take other appropriate action.

Figure 4:
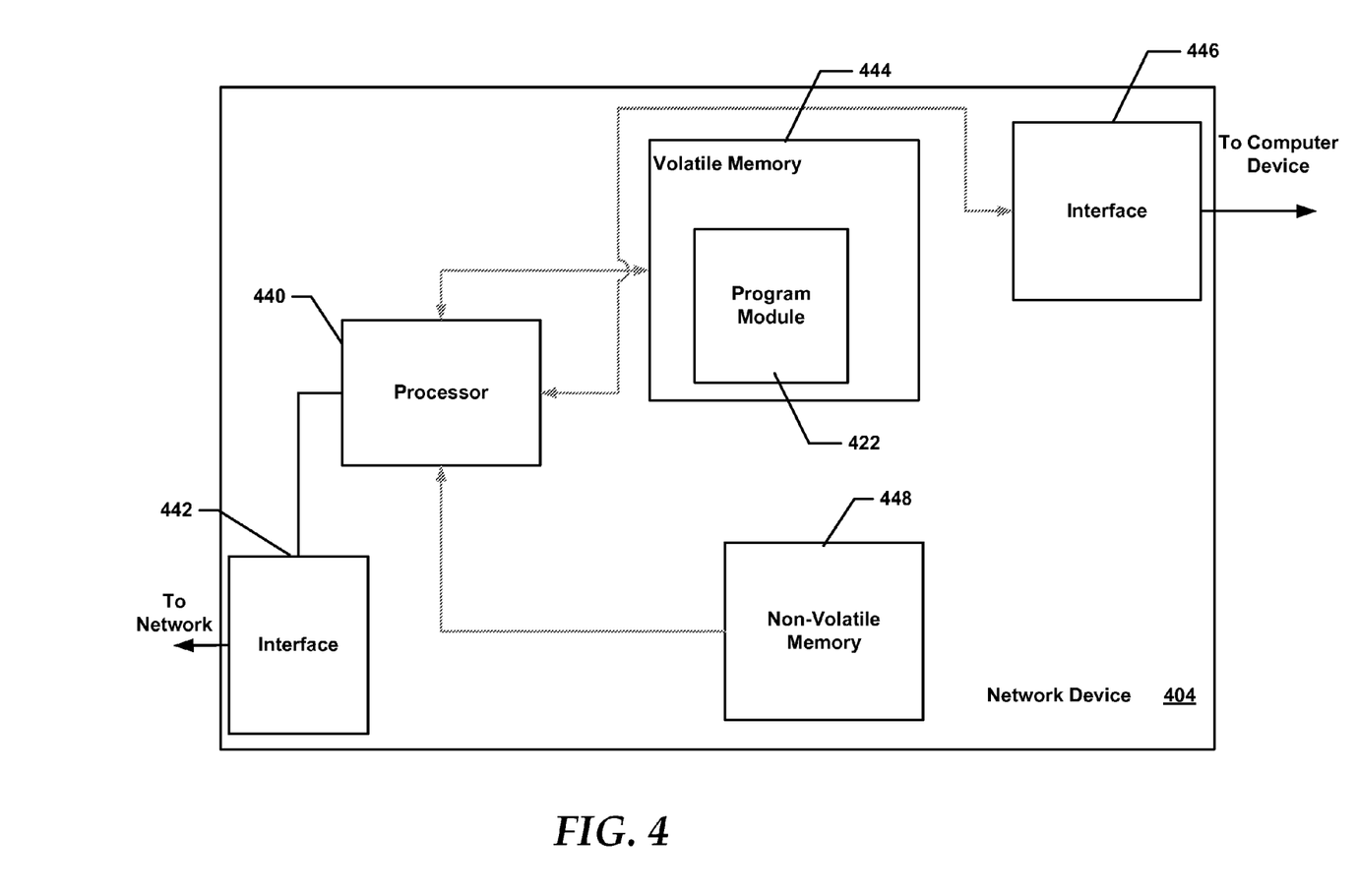
FIG. 4 is a block diagram of a particular embodiment of a network device.

Referring to FIG. 4, a block diagram of a particular embodiment of a network device 404, corresponding to the network device 104 of FIG. 1, is illustrated. As shown, network device 404 includes two interfaces 442 and 446. In practice, interface 442 may go to the network 106, and interface 446 may go to the computer device 102. Depending upon implementation detail, either or both interfaces may include a bus, an Ethernet compliant interface, a USB interface, a SCSI interface, a PCI interface, a PCI-E interface, a wireless interface, some other appropriate interface, and/or a combination thereof. The network device 404 may also includes a processor 440, a volatile memory 444, and a non-volatile memory 448. As depicted, processor 440 can access the non-volatile memory 448 and the volatile memory 444. In addition, the processor 440 may be "connected" to both the computer device 102 and the network 106 via interfaces 442 and 446 respectively.

The processor 440 may be a microprocessor, a microcomputer, a central processing unit (CPU), an FPGA or some other processing device or some combination thereof. The interface 442 may be a bus interface such as PCI, PCI-E, or USB, a backplane bus, an Ethernet interface, or other communications interface. The volatile memory 444 may be a random access memory (RAM), or other volatile memory device. The non-volatile memory 448 may be a read only memory (ROM), flash memory, or other non-volatile memory. In practice, either the volatile memory 444 or the Non-Volatile Memory 448 stores the program module 422 that has been provided by the host program 103 as described above with respect to FIG. 2 or which has been preloaded into the Non-Volatile Memory 448. In another embodiment, the Non-Volatile memory might contain the pre-arranged port number on which the host program may be expected to be transmitted from the host to the network device.

During operation, network device 404 monitors messages between the host program 103 and the client program 107, intercepts those communications targeted to ports that have been reserved for the network device 404, and executes the program module 422 in response to the intercepted messages. By intercepting and locally processing the messages between the host program 103 and the client program 107, the network device 404 can pose as the host program 103 for particular messages.

In practice, the messages between the programs are monitored by processor 440 via the interface 442, which receives communications from the client program 107. When the processor 440 detects an appropriate communication between the client resident program and the server resident program, the processor 440 intercepts the communication, and accesses the program module 422 stored in the volatile memory 444. The processor 440 executes the appropriate portion of the program module 422 to respond to the intercepted communication via the interface 442. In this way, the network device 404 poses as the host program 103. After responding to the communication, the processor 440 can also send update information to the host program 103 to take appropriate action.

What is claimed is:

1. A method, comprising:

receiving at a network interface device a first indication from a host device that a first port of the host device has been reserved for the network interface device, the network interface device configured to provide a communication interface between the host device and a network;

receiving a program module at a first socket of the network interface device from the host device, wherein the program module comprises a portion of a program executing at the host device, wherein the first socket is associated with a loopback address of the host device;

in response to receiving the first indication, intercepting a plurality of messages from a client device of the network, the plurality of messages targeted to the first port of the host device;

executing the program module previously received from the host device at the network interface device to process the plurality of messages at the network interface device in response to determining that the plurality of messages transmitted from the client device and intercepted at the network interface device are targeted to the first port of the host device;

receiving a message from the host device that indicates at least one modification to the program module previously received from the host device; and modifying the program module at the network interface device in accordance with the at least one modification to the program module previously received from the host device.

2. The method of claim 1, further comprising:

receiving a first message from the client device, the first message targeted to a second port of the host device;

sending the first message to the host device without processing the first message based on the program module in response to determining that the first message is targeted to the second port.

3. The method of claim 1, wherein said receiving the program module at the first socket of network interface device from the host device comprises:

receiving, from the host device, an indication at the first socket of the network interface device that the program module will be transmitted;

receiving, from the host device, the program module at the first socket of the network interface device, wherein the program module is to be executed to process the plurality of messages that are transmitted from the client device, targeted to the first port of the host device, and intercepted by the network interface device; and storing the program module at the network interface device in response to receiving the indication and the program module from the host device.

4. The method of claim 1, wherein the message from the host device is received via a second socket of the network interface device.

5. The method of claim 1, further comprising:
sending a request from the network interface device to the host device to reserve the first port;
wherein the first indication from the host device is received in response to the request.

6. A method, comprising:
opening a first socket at a host device, wherein the first socket is associated with a loop back address of the host device;
transmitting, to a network interface device, an indication from the host device that a first port of the host device has been reserved for the network interface device, wherein the network interface device is configured to provide a communication interface between the host device and a network;
transmitting a program module to the network interface device via the first socket, the program module to be executed at the network interface device to process a plurality of messages received from the network and that are directed to the first port of the host device, wherein the program module comprises a portion of a program executing at the host device
receiving, from the network interface device, a first message generated by a client device of the network at a second socket of the host device, wherein the first message generated by the client device was intercepted by the network interface device and retransmitted by the network interface device to the host device;
transmitting, to the network interface device, a second message from the host device that indicates at least one modification to the program module previously transmitted to the network interface device; and
causing the network interface device to modify the program module at the network interface device in accordance with the at least one modification to the program module transmitted by the host device.

7. The method of claim 6, wherein the indication to the network interface device indicates that subsequent messages from the client device associated with the first port of the host device should be intercepted at the network interface device.

8. The method of claim 7, wherein the first port is associated with a loopback port of the host device.

9. The method of claim 8, further comprising transmitting a third message from the host device to the network interface device via the first port.

10. The method of claim 8, further comprising receiving the subsequent messages at the host device.

11. The method of claim 10, wherein the subsequent messages are received at the host device via the first port.

12. The method of claim 6, wherein said transmitting the indication from the host device that the first port of the host device has been reserved for the network interface device comprises:
receiving a request from the network interface device to reserve the first port at the host device;
reserving the first port in response to the request; and
transmitting the indication to the network interface device that subsequent messages from the client device associated with the first port of the host device should be intercepted at the network interface device.

13. The method of claim 6, wherein said causing the network interface device to modify the program module further comprises: transmitting instructions to the network interface device to modify the program module.

14. The method of claim 6, further comprising:
transmitting a notification to the network interface device to indicate that the plurality of messages received from the network and directed to the first port of the host device should be processed by the program module of the network interface device and should be forwarded to the host device.

15. A network device, comprising:
a first socket configured to receive messages from a host device, wherein the first socket is associated with a loopback address of the host device;
a second socket configured to receive messages from a client device;
a network interface device configured to provide an interface between the client device and a network, the network interface device configured to:
receive a first indication from a host device that a first port of the host device has been reserved for the network interface device;
receive a program module from the host device via the first socket, wherein the program module comprises a portion of a program executing at the host device;
intercept a first message from the client device targeted to a first port of the host device in response to the first indication received via the first socket that the first port has been reserved for the network interface device;
execute the program module previously received from the host device to process the first message in response to determining that the first message transmitted by the client device and intercepted by the network interface device is targeted to the first port of the host device;
receive a second message from the host device that indicates at least one modification to the program module previously received from the host device; and
modify the program module at the network interface device in accordance with the at least one modification to the program module previously received from the host device.

16. The network device of claim 15, further comprising a third socket to provide messages from the client device targeted to a second port of the host device.

17. The network device of claim 15, wherein the network interface device configured to receive the program module at the network interface device from the host device via the first socket comprises the network interface device configured to:
receive from the host device, an indication via the first socket that the program module will be transmitted;
receive, from the host device, the program module via the first socket for execution to process messages that are transmitted from the client device, targeted to the first port of the host device, and intercepted by the network interface device;
store the program module at the network interface device in response to receiving the indication and the program module from the host device.

18. A network device comprising:
a processor; and
a host device coupled with the processor, the host device configured to:

open a first socket at the host device, wherein the first socket is associated with a loopback address of the host device;

transmit, to a network interface device, an indication from the host device that a first port of the host device has been reserved for the network interface device, wherein the network interface device is configured to provide a communication interface between the host device and a network;

transmit a program module to the network interface device via the first socket, the program module to be executed at the network interface device to process a plurality of messages received from the network and that are directed to the first port of the host device, wherein the program module comprises a portion of a program executing at the host device;

receive, from the network interface device, a first message generated by a client device of the network at a second socket of the host device, wherein the first message generated by the client device was intercepted by the network interface device and retransmitted by the network interface device to the host device;

transmit, to the network interface device, a second message from the host device that indicates at least one modification to the program module previously transmitted to the network interface device; and cause the network interface device to modify the program module at the network interface device in accordance with the at least one modification to the program module transmitted by the host device.

19. The network device of claim 18, wherein the indication to the network interface device indicates that subsequent messages from the client device associated with the first port of the host device should be intercepted at the network interface device.

20. The network device of claim 18, wherein the host device configured to transmit the indication from the host device that the first port of the host device has been reserved for the network interface device comprises the host device configured to:

receive a request from the network interface device to reserve the first port at the host device;

reserving the first port in response to the request; and transmitting the indication to the network interface device that subsequent messages from the client device associated with the first port of the host device should be intercepted at the network interface device.

21. The network device of claim 18, wherein the host device configured to cause the network interface device to modify the program module further comprises the host device configured to:

transmit instructions to the network interface device to modify the program module.

* * * * *